United States Patent [19]

Funakubo et al.

[11] 3,849,298

[45] Nov. 19, 1974

[54] PROCESS FOR PREPARING PURIFIED NORMAL PARAFFINS

[75] Inventors: Eiichi Funakubo, Ashiya; Tetsuo Matsuo, Kobe; Takeshi Taira, Kobe; Taichi Kamada, Kobe; Hiroshi Harada, Kobe; Shoichiro Tanimura, Kobe; Masanori Kubo, Kobe, all of Japan

[73] Assignee: Kanegafuchi Kagaku Kogyo Kabushiki Kaisha, Osaka, Japan

[22] Filed: Oct. 24, 1972

[21] Appl. No.: 300,404

[30] Foreign Application Priority Data
Oct. 21, 1971  Japan................................ 46-83771
Oct. 21, 1971  Japan................................ 46-83772

[52] U.S. Cl............... 208/310, 195/28 R, 208/299, 208/307, 252/414, 252/420, 260/674 R
[51] Int. Cl........................................... C10g 25/00
[58] Field of Search... 260/674 SA, 676 AD, 674 R; 208/310, 299, 99, 307

[56] References Cited

UNITED STATES PATENTS

| | | | |
|---|---|---|---|
| 2,470,339 | 5/1949 | Claussen et al............... | 260/674 SA |
| 2,628,933 | 2/1953 | Eagle et al................... | 260/674 SA |
| 2,848,379 | 8/1958 | Rehner et al. ........................ | 208/99 |
| 2,930,821 | 3/1960 | Schwoegler et al........... | 260/674 SA |

*Primary Examiner*—Herbert Levine
*Attorney, Agent, or Firm*—Moonray Kojima

[57] ABSTRACT

Process of purifying normal paraffins by using alumina or a mixture of alumina and silica to adsorb one or more carcinogenic polycyclic aromatic hydrocarbons and other contaminants therein. Also, the adsorbent is desorbed and reactivated by treatment using aliphatic hydrocarbons of 5–8 carbon atoms, monocyclic aromatic hydrocarbons, aliphatic alcohols of 1–4 carbon atoms, or mixtures thereof, alcohol having 2–6 carbon atoms alone or together with water and subsequent treatment with steam and inert gas.

21 Claims, No Drawings

PROCESS FOR PREPARING PURIFIED NORMAL PARAFFINS

BACKGROUND OF THE INVENTION

This invention relates to a process for preparing purified normal paraffins, such as those which are suitable for use as starting materials for feed or food petroleum fermentation products.

In case a petroleum fermentation product is to be used for feeds or foods, it is necessary that normal paraffins do not contain even an extremely small amount of carcinogenic polycyclic aromatic hydrocarbons or other impurities.

Such carcinogenic polycyclic aromatic hydrocarbons, which may be those which are pentacyclic, may be benz (a) pyrene, 20-methyl cholanthrene and dibenz (a,h) anthracene. The concentration of these compounds may be less than 0.1 ppm and in general of the order of ppb. The other impurities may be sulfur compounds, tarry substances, acidic substances, coloring substances and the like.

In the prior art, there has been only one process for removing carcinogenic polycyclic aromatic hydrocarbons and impurities from normal paraffins to obtain purified normal paraffins on a commercial scale. This prior art process comprises treatment with fuming sulfuric acid. However, this process leaves much to be desired, since in operation two liquid layers of different specific gravities must be contacted and reacted efficiently with each other, and furthermore, such prior method has other problems such as corrosion of the apparatus and treatment of waste sulfuric acid.

SUMMARY OF INVENTION

The purification process invented by the inventors is an excellent process in which the impurities are separated physically. The inventive process can be carried out repeatedly in a reversible manner. More particularly, the present invention relates to a process for preparing purified normal paraffins suitable for use as starting materials of dietary petroleum fermentation products by removing carcinogenic polycyclic aromatic hydrocarbons sometimes called carcinogenic substances from the normal paraffins.

The inventive method may employ normal paraffins of a viscosity above 1 centipoise and containing less than 0.1 ppm concentration of carcinogenic polycyclic aromatic hydrocarbons, such as benz (a) pyrene. The normal paraffins containing the contaminants are subject to adsorption treatment by feeding them into a tower filled with alumina of average particle size of 8-100 mesh and surface area of more than 100 m²/g and/or alumina containing less than 15 wt. percent of silica, at a temperature of 20°-100°C thereby to reduce concentration of the carcinogenic polycyclic aromatic hydrocarbons, such as benz (a) pyrene, in the normal paraffins to less than 1 ppb.

As a different aspect of the invention, steps are provided for desorbing and reactivating the absorbent for reuse as an absorbent, as will be set forth in the following description. The present invention will be described below in detail.

DETAILED DESCRIPTION OF INVENTION

Adsorption process has been employed in general as column chromatography on a laboratory scale in the field of purification analysis. This method was previously applied to a substance to be adsorbed of concentration of the order of percent ($10^{-2}$) or at least ppm ($10^{-6}$) and viscosity of the solution has been particularly low, i.e. less than 1 centipoise, for facilitating the analysis in general. Further adsorption-separation process carried out on a commercial scale in this technical field is aimed to separate and thereby to remove only water, monocyclic aromatic hydrocarbons and lower sulfur compounds from lower hydrocarbons. Limiting concentration of these impurities in the purified product was at the lowest 1 ppm, but never below.

There has never been proposed a process for directly separating carcinogenic polycyclic aromatic hydrocarbons, such as benz (a) pyrene, contained in an extremely small amount such as up to 0.1 ppm in higher normal paraffins of a high viscosity above 1 centipoise, thereby reducing the content of carcinogenic polycyclic aromatic hydrocarbons to the order of less than ppb (near analysis accuracy) by adsorption as is done in the present invention.

The inventors have found that, for higher normal paraffins, such as those having 9-28 carbon atoms, and of a high viscostiy, such as above 1 centipoise (25°C), preferred adsorbents are those containing alumina of particle size of 8-100 meshes and surface area of more than 100 m²/g or alumina of surface area of similar particle size and surface area containing less than 15 wt. percent of silica. It was found that if the surface area is less than 100 m²/g and/or if particle size is more than 8 meshes, adsorption capacity of the adsorbent for carcinogenic polycyclic aromatic hydrocarbons is reduced remarkably and the major part of such hydrocarbons becomes difficultly adsorbed due to the so-called by-pass phenomenon. It has also been found that, if particle size is less than 100 meshes, difference in pressure between the upper and the lower parts of a processing tower becomes large and impractical prolongation of treatment time is inevitably caused. The alumina and silica may be used in the form of a mixture in the mentioned proportion.

As for relationship between adsorption capacity and temperature, inclination of desorption is observed generally as temperature is raised. However, according to the present invention, acceptable results were obtained at 20°C to 100°C and preferred results were obtained at raised temperatures of about 40°-80°C. Though this phenomenon is apparently against general adsorption, it is theorized that if carcinogenic polycyclic aromatic hydrocarbons in a quite low concentration, are to be adsorbed, as in the present invention, it is better to elevate the temperature to increase the effect of facilitating molecule movement.

Benz (a) pyrene is a typical carcinogenic polycyclic aromatic hydrocarbon. Other carcinogenic substances are contained in normal paraffins in far smaller amounts than benz (a) pyrene. The latter are more easily removable by adsorption than benz (a) pyrene. Therefore, in the measurement and testing of removal of carcinogenic substances, benz (a) pyrene was measured and used as a typical carcinogenic substance.

By overall food examination according to a method of J. W. Howard et al. [Journal of the A.O.A.C. (Journal of the association of Official Agricultural Chemists) 48, No. 2,30 (1965)], it was proven that the products of this invention came up to the standards of food additives.

The present invention relates further to an industrial process for preparing purified normal paraffins suitable for use by a method of desorbing and thereby activating used and adsorbed adsorbent to be used again for adsorbing impurities. After a long period investigation as to conditions of regeneration of adsorbent indispensable for carrying out the adsorption-purification process on a commercial scale, the inventors have found the following inventive process.

After the adsorbing treatment as outlined above, the adsorbent is treated with (A) one or more solvents selected from the group consisting of aliphatic hydrocarbons of 5-8 carbon atoms and/or monocyclic aromatic hydrocarbons and (B) one or more solvents selected from the group consisting of aliphatic alcohols of 1-4 carbon atoms. The solvents (A) and (B) may be used separately or in the form of a combined misture. Alternatively the adsorbent may be washed and thereby desorbed with (C) an alcohol of 2-6 carbon atoms alone or together with water. In both cases the adsorbent is then treated with steam and an inert gas successively. The thus treated adsorbent is used again for adsorption.

The present invention will now be described below in detail.

Normal paraffins to be treated according to the present invention are those of 9-28 carbon atoms and having a high viscosity above 1 centipoise (as measured at 25°C). It is important that (A) the paraffins be dissolved enough and matters adhering to the adsorbent be washed away thoroughly and (B) substances (such as polycyclic aromatic hydrocarbons) adsorbed on the adsorbent are desorbed therefrom to regenerate a clean adsorbent.

If both items (A) and (B) are not performed effectively, a small amount of the carcinogenic substances may remain on the adsorbent to contaminate normal paraffins in the next adsorption step thereby lowering activity of the adsorbent remarkably and also shortening the life of the adsorbent per se. In accordance with this invention, suitable solvents were used to remove contaminants from the adsorbent and to cause reactivation.

Agents used to produce condition (A) may be aliphatic hydrocarbons and/or monocyclic aromatic hydrocarbons of 5-8 carbon atoms. Aliphatic hydrocarbons of less than 5 carbon atoms are in gaseous form at ambient temperatures and those of more than 8 carbon atoms are unsuitable due to their poor deterging effects.

The most suitable agents used to produce the aforementioned condition (B) may be aliphatic alcohols of 1-4 carbon atoms. If aliphatic alcohols of more than 4 carbon atoms are used, desorption action of the adsorbed matters becomes inferior. One or more solvents selected from those used to obtain conditions (A) and (B) may be used separately or they may be used in the form of mixture to effect the two desorption steps at the same time.

As an agent having properties and functions of both (A) and (B), aliphatic alcohols of 2-6 carbon atoms or mixture solvent consisting of one or more of these alcohols and water are suitable. They have excellent desorption and deterging effects. Although the alcohol of one carbon atom exhibits a desorption effect, its deterging effect is inferior. The alcohols of more than 6 carbon atoms have inferior deterging and desorption effects and, therefore, they are not suitable for the purification of normal paraffins.

After the desorption, the highly adsorptive alcohols, etc. adsorbed selectly on the adsorbent are expelled efficiently by means of steam. Then the adsorbent is treated with an inert gas heated to a temperature below 300°C to complete the activation-regeneration step.

By carrying out the above procedures, the adsorbent can be used repeatedly and safely for the purification process for many cycles without necessity of exchange.

The invention will now be illustrated by actual example.

EXAMPLE 1

A stainless steel adsorption tower of effective area of 4.3 cm × 72 cm was filled with about 0.94 Kg of 20-30 mesh alumina having a surface area of 200 $m^2$/gm. Then crude normal paraffins (those of 10-25 carbon atoms containing, for example, 12 ppb of benz $(a)$ purene and 3 ppb of dibenz $(a,h)$ anthracene as carcinogenic compounds) were passed through the tower upwardly from the bottom at a flow velocity of about 5.2 liters/hr. at about 50°C.

After the normal paraffins were treated in a quantity of fifty times as much weight as the adsorbent, the liquid passed through the tower was removed and concentrations of benz $(a)$ pyrene, dibenz $(a,h)$ anthracene and 20-methylcholanthrene were determined to be less than 1 ppb according to fluoroscene spectroanalysis. Overall examination was effected according to the method of J. W. Howard et al, to prove that the product came up to acceptable standards. The liquid passed through the tower was colorless and transparent and contained neither tarry substance nor acidic substance and total sulfur content thereof was less than 0.1 ppm.

In a further example, the adsorption was carried out in the same manner as above except that adsorption temperature was about 25°C. The results obtained were the same as above.

EXAMPLE 2

The same adsorption tower as in Example 1 was filled with 14-32 mesh alumina having surface area of about 400 $m^2$/gm containing about 10 wt. percent of silica and then crude normal paraffins (those of 14-20 carbon atoms containing, for example, 11 ppb of benz $(a)$ pyrene as carcinogenic compound) were passed through the tower upwardly from the bottom at a flow velocity of about 5.2 liters/hr.

Temperature in the adsorption treatment was kept at about 70°C. After the sample was passed through the tower in a quantity of about 250 times as much weight as the adsorbent, the sample was taken and concentration of benz $(a)$ pyrene in the liquid was determined to be less than 1 ppb.

According to the same overall examination method as in Example 1, it was found that the product came up to acceptable standards of food additives.

The liquid passed through the tower was colorless and transparent and contained neither tarry substance nor acidic substance. Total sulfur content of 0.6 ppm of the crude sample was reduced to less than 0.1 ppm.

In a further example, the adsorption experiment was carried out in the same manner as above in this Example 2, except that adsorption temperature was about 100°C. The results obtained were the same as above.

The results of Examples 1 and 2 are shown in Table 1, below.

Comparative Example 1

Through a tower filled with 0.73 Kg of silica gel of a surface area of 730 m²/g and 20-30 meshes in place of alumina used in Example 1, crude normal paraffins of the same quality as in Example 1 were passed upwardly from the bottom at a flow velocity of 5.2 liters/hr. Adsorption temperature was the same as in Example 1 (50°C).

After the normal paraffins were treated in a quantity of 10 times as much weight as the adsorbent, the liquid passed through the tower was taken out and concentration of benz (a) pyrene in the liquid was found to be 5 ppb.

According to the overall examination of J. W. Howard et al., it was found that the product did not come up to acceptable standards for food additives.

The liquid passed through the tower was colorless and transparent and contained neither tarry substance nor acidic substance. Total sulfur content of the product was less than 0.1 ppm. Adsorption conditions and degree of removal of the carcinogenic polycyclic aromatic compounds are shown in Table 1.

Comparative Example 2

Normal paraffins were passed through the tower in the same manner as in Example 1 except that adsorption temperature was 18°C.

After the normal paraffins were treated in a quantity of 50 times as much weight as the adsorbent, dibenz-(a,h) anthracene content and 20-methylchlanthrene content of the liquid passed through the tower were found to be less than 1 ppb but benz(a)pyrene content thereof was 3 ppb.

When the adsorption was effected at 110°C, the benz(a)pyrene content of the liquid was 3 ppb after the same quantity as above of the normal paraffins were treated.

EXAMPLE 3

A stainless steel adsorption tower of effective area of 4.3 cm × 72 cm was filled with about 0.94 Kg of 20-30 mesh alumina having surface area of 200 m²/g and then crude normal paraffins (those of 12-25 carbon atoms containing, for example, 12 ppb of benz(a)pyrene and 3 ppb of dibenz(a,h) anthracene as carcinogenic compounds) were passed through the tower upwardly from Table 1

Adsorption conditions and degree of removal of carcinogenic polycyclic aromatic compounds

|  | Adsorbent | Adsorption temp. (°C) | Average surface area (m²/g) | Particle size (mesh) | Amount of paraffins treated/ unit adsorbent | Benz(a) pyrene (ppb) | Overall examin. of polycyclic aromatics standards of food additives | Pressure loss based on 20-30 meshes |
|---|---|---|---|---|---|---|---|---|
| Present invention 1 | Alumina | 50 | 200 | 20-30 | 50 | less than 1 | pass | |
| Present invention 2 | Alumina containing 10% silica | 70 | 400 | 14-32 | 50 | less than 1 | pass | |
| Present invention A | Alumina containing 10% silica | 50 | 400 | 10-20 | 50 | less than 1 | pass | |
| Compartive example 1 | Silica gel | 50 | 730 | 20-30 | 10 | 5 | not pass | |
| Comparative example A | Alumina | 50 | 200 | 20-30 | 100 | 7 | not pass | |
| Comparative example B | Alumina containing 10% silica | 50 | 400 | 14-32 | 170 | 6 | not pass | |
| Comparative example C | Alumina | 50 | 200 | 5-8 | 20 | 5 | not pass | |
| Comparative example D | Alumina | 50 | 70 | 20-30 | 15 | 5 | not pass | |
| Comparative example E | Alumina containing 18% silica | 50 | 300 | 10-20 | 50 | 5 | pass | |
| Comparative example F | Alumina | 50 | 140 | 100-300 | 200 | 1 | pass | 80 |

(Note) The starting normal paraffin mixture was a light yellow liquid of 10-25 carbon atoms, viscosity of 3.4 centipoises (25°C) and containing, for example, 12 ppb of benz(a)pyrene as carcionogenic polycyclic aromatic hydrocarbon.

(Note) Example A, and Comparison Examples A, B, C, D, E and F were carried out using the conditions of Example 1, and Comparison Example 1, respectively with the components changed as indicated.

the bottom at a flow velocity of about 5.2 liters/hr. at about 50°C.

After the normal paraffins were treated in a quantity of 50 times as much weight as the adsorbent, the adsorption operation was stopped. Then, n-hexane was passed downwardly from the top of the adsorption tower therethrough at a flow velocity of about 3 liters/hr. for about 2 hours. Then, methanol was passed therethrough at a velocity of about 3 liters/hr. for about 4 hours. Finally steam was passed therethrough to complete the desorption. Thereafter, the insside of the tower was heated to 220°C–250°C with 2 Nm$^3$/hr. of heated nitrogen for about 2.5 hours and then cooled to complete the regeneration.

This process in which desorption-activation-regeneration is effected directly after the adsorption treatment of normal paraffins in a quantity of 50 times as much weight as the adsorbent was repeated 10 times. Benz($a$)pyrene content and dibenz($a,h$)anthracene content of the normal paraffins passed through the tower at the 10th time were determined to be less than 1 ppb each.

The purified normal paraffins thus obtained were in the form of colorless, transparent fluid liquid containing neither tarry substance nor acidic substance. Total sulfur content of the product was less than 0.1 ppm.

By overall examination according to a method of J. W. Howard, et al [J.O.A.C. 48, No. 2,304 (1965)], it was proven that the product came up to acceptable standards of food additives.

EXAMPLE 4

The same adsorption apparatus as in Example 3 was used. The same adsorption tower as in Example 3 was filled with 14–32 mesh alumina having surface area of about 400 m$^2$/g and containing about 10 wt. percent of silica. Then, crude normal paraffins (those of 14–20 carbon atoms containing, for example, 11 ppb of benz-($a$)pyrene as carcinogenic compound) were passed through the tower upwardly from the bottom at a flow velocity of about 5.2 liters/hr.

Temperature in the adsorption treatment was kept at about 70°C. After the same was passed through the tower in a quantity of about 150 times as much as the adsorbent, the adsorption operation was stopped. A mixed solution of propanol and water was passed through the tower downwardly from the top of the tower at a velocity of about 3 liters/hr. for about 4 hours. Then, steam was passed therethrough to complete the desorption. Thereafter, the inside of the tower was heated to 220°C–250°C with 2 Nm$^3$/hr. of nitrogen for about 2.5 hours to complete the activation-regeneration.

This cycle comprising treatment of 150 times as much weight as adsorbent of the crude normal paraffins followed by the desorption-regeneration was repeated. After completion of 10 cycles, the resulting normal paraffins were examined to reveal that benz($a$)-pyrene content thereof was less than 1 ppb and they contained less than 0.1 ppm of total sulfur and substantially no acidic substance or tarry substance. The product was colorless transparent fluid liquid.

It was confirmed by the method of J. W. Howard, et al, that the product came up to acceptable standards of food additives.

Comparative Example 4

The adsorption operation was carried out under the same adsorption conditions by using the same apparatus, adsorbent and starting normal paraffins as in Example 3. After the adsorption, desorption was effected by passing n-hexane through the adsorbent at a velocity of about 3 liters/hr. for about 6 hours and then passing steam therethrough. Directly thereafter, the inside of the tower was heated to 220°C–250°C with 2 Nm$^3$/hr of nitrogen for about 2.5 hours and then cooled to complete the regeneration. As in Example 3, one cycle comprised treatment of normal paraffins in a quantity of 50 times as much weight as the adsorbent. In the second cycle, after 20 times as much weight as the adsorbent of the normal paraffins were treated, the liquid passed through the tower was examined to reveal that benz ($a$)pyrene content was 5 ppb. The product was fluid liquid free from impurities as in Example 3, but the product did not come up to the acceptable standards of food additives according to the method of J. W. Howard, et al.

Comparative Example 5

The adsorption, desorption, activation and regeneration were carried out in the same manner as in Comparative Example 4 except that methanol was used as desorbent. In the second cycle, after 30 times as much weight as the adsorbent of the normal paraffins were treated, the liquid passed through the tower was examined to reveal that benz($a$)pyrene content was 5 ppb. The product did not come up to the acceptable standards of food additives according to the Howard's method. The appearance and other properties of the product were the same as those of Comparative Example 4.

EXAMPLE 5

A mixed solvent comprising benzene and methanol in place of n-hexane and methanol used in Example 3 was passed through the adsorbent from the top to the bottom at a velocity of about 3 liters/hr. for about 4 hours. Other conditions were the same as in Example 3. Benz-($a$)pyrene content was below 1 ppb also in this case. The same results were obtained when toluene/xylene was used in place of benzene.

Comparative Example 6

The adsorption operation was carried out in the same adsorption conditions such as apparatus, adsorbent and starting normal paraffins as in Example 3. Thereafter, desorption was carried out by passing benzene through the tower at a volocity of about 3 liters/hr. for 6 hours. Then, the same treatment as in Example 3 was effected.

The results of analysis proved that benz($a$)pyrene content was 6 ppb, which did not come up to the Howard's standards of food additives.

Comparative Example 7

The same procedures as in Example 3 were effected except that steam was not used. An operation that desorption, reactivation and regeneration were effected directly after 50 times as much weight as the adsorbent of the normal paraffins were adsorbed was repeated 5 times. Benz($a$)pyrene content of the normal paraffins obtained in the 5th passing was determined to be 6 ppb. The product did not come up to the standards according to the method of J. W. Howard, et al.

EXAMPLE 6

The same procedures as in Example 4 were carried out except that propanol alone was used as desorbing solvent. After completion of 10 cycles, the resulting n-paraffins were examined to reveal that benz($a$)pyrene content was less than 1 ppb. The product passed the J. W. Howard's examination.

EXAMPLE 7

The same procedures as in Example 3 were carried out except that isooctane was used in place of n-hexane, and ethanol was used in place of methanol. The same results as in Example 3 were obtained.

Comparative Example 8

The same procedures as in Example 3 were carried out except that the adsorbent was washed with hydrocarbons of 9–12 carbon atoms in place of n-hexane and then treated with n-octanol in place of methanol. In the third cycle, after the normal paraffins were passed in a quantity of 30 times as much weight as the adsorbent, the examination of the product revealed that benz($a$)pyrene content was 5 ppb.

The results of the examination according to Howard's method did not come up to the standards.

EXAMPLE 8

The same procedures as in Example 4 were carried out except that a mixed solvent comprising hexyl alcohol and water was used in place of the mixed solvent comprising propanol and water as desorption solvent. After completion of 5 cycles of adsorption and desorption-regeneration, the resulting normal paraffin product was examined to reveal that benz($a$)pyrene content was less than 1 ppb. which passed the Howard's examination.

The same results were obtained also when hexyl alcohol alone was used as solvent.

Comparative Example 9

The same procedures as in Example 4 were carried out except that octyl alcohol alone was used as desorption solvent. After two cycles of adsorption and desorption-regeneration, the resulting normal paraffins were examined to reveal that benz($a$)pyrene content was 5 ppb. The product did not come up to the standards of the Howard's method.

The foregoing description is intended to be illustrative of the principles of this invention. Numerous other variations and modifications thereof would be apparent to one skilled in the art. All such variations and modifications are intended to be encompassed within the spirit and scope of the invention.

What is claimed is:

1. Process for purifying normal paraffins which are suitable for use as starting materials or raw materials for feed or food petroleum fermentation products, comprising the steps of subjecting normal paraffins containing one or more carcinogenic polycyclic aromatic hydrocarbons to adsorption treatment in an adsorbent consisting essentially of alumina or a mixture of alumina and up to 15 weight percent of silica thereby to reduce said carcinogenic polycyclic aromatic hydrocarbons to less than 1 ppb, said alumina having a particle size of from 8 to 100 mesh, said adsorption treatment being carried out at a temperature of from 20°C to 100°C, and said alumina having a surface area of 100 m²/g or more.

2. Process of claim 1, wherein said adsorption treatment is carried out in a vertical tower by feeding untreated normal paraffins therein with said alumina or mixture of alumina and silica being therein.

3. Process of claim 1, wherein said normal paraffins which are subjected to adsorption treatment are normal paraffins 9–28 carbon atoms having a viscosity measured at 25°C, of 1 centipoise or more, and carcinogenic polycyclic aromatic hydrocarbons content of up to 0.1 ppm.

4. Process of claim 1, wherein said temperature is from 40°C to 80°C.

5. Process of claim 1, further comprising the steps of treating said alumina or mixture of alumina and silica after said adsorption treatment with one or more solvents selected from the group consisting of (a) aliphatic hydrocarbons of 5–8 carbon atoms, (b) monocyclic aromatic hydrocarbons, (c) aliphatic alcohols of 1–4 carbon atoms, and (d) mixtures thereof, or with an alcohol of 2–6 carbon atoms alone or with water, and thereafter successively treating said alumina or mixture of alumina and silica with steam and inert gas.

6. Process of claim 5, wherein said aliphatic hydrocarbons having 5–8 carbon atoms and/or monocyclic aromatic hydrocarbons are used in a separate step or in a common step with said aliphatic alcohols of 1–4 carbon atoms.

7. Process of claim 5, wherein said aliphatic alcohol having 2–6 carbon atoms, or said aliphatic alcohol having 2–6 carbon atoms together with water are used.

8. Process of claim 5, wherein said treatment with said inert gas is at a temperature of up to 300°C.

9. Process of claim 1, wherein said adsorption treatment removes sulfur compounds, tarry substances, acidic substances, coloring substances and the like from said normal paraffins to a level of 1 ppb or less.

10. Process of claim 1, wherein said carcinogenic polycyclic aromatic hydrocarbons are one or more of benz($a$)pyrene, dibenz($a,h$)anthrocene and 20-methylcholanthrene.

11. Process of claim 5, wherein alumina is used, and subsequently treated with n-hexane, methanol, steam and at a temperature of 220°C to 250°C with nitrogen.

12. Process of claim 5, wherein a mixture of alumina and 10 weight percent of silica is used, and subsequent to the adsorption treatment, is treated with either propanol or a mixture of propanol and water, steam and at a temperature of 220°C to 250°C with nitrogen.

13. Process of claim 5, wherein said after adsorption steps are repeated before using said alumina or mixture of alumina and silica for said adsorption treatment.

14. Process of claim 11, wherein ethanol is used in place of methanol, and isooctane is used in place of n-hexane.

15. Process of claim 12, wherein a mixture of hexyl alcohol and water is used in place of propanol and water.

16. Process of claim 1, wherein said normal paraffins are passed through said alumina or said mixture of alumina and silica at a velocity of about 5 liter/hour.

17. Process of claim 5, wherein said after adsorption treatment is effected after the quantity subject to adsorption is 50 to 250 times the weight of said alumina or said mixture of alumina and silica.

18. Process of claim 1, wherein alumina is used having a particle size of 10–32 mesh and surface area of 200 m²/gm to 400 m²/gm.

19. Process of claim 1, wherein a mixture of benzene and methanol is used in place of n-hexane and methanol.

20. Process of claim 1, wherein said adsorption is performed at a temperature between 50°C to 70°C.

21. Process of claim 1, wherein a mixture of alumina and about 10 weight percent of silica is used.

* * * * *